(12) United States Patent
Lin et al.

(10) Patent No.: US 11,437,918 B2
(45) Date of Patent: Sep. 6, 2022

(54) LLC RESONANT CONVERTER

(71) Applicant: National Taiwan University of Science and Technology, Taipei (TW)

(72) Inventors: Jing-Yuan Lin, New Taipei (TW); Pin-Hsien Liu, Changhua County (TW); Ju-Hsin Chen, Taoyuan (TW); Hsuan-Yu Yueh, Taoyuan (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 0 days.

(21) Appl. No.: 17/308,188

(22) Filed: May 5, 2021

(65) Prior Publication Data

US 2022/0140741 A1    May 5, 2022

(30) Foreign Application Priority Data

Nov. 2, 2020  (TW) .................................. 109138052

(51) Int. Cl.
*H02M 3/335*    (2006.01)
*H02M 1/00*    (2006.01)

(52) U.S. Cl.
CPC ..... *H02M 3/33592* (2013.01); *H02M 1/0058* (2021.05)

(58) Field of Classification Search
CPC ........... H02M 3/33592; H02M 1/0058; H02M 1/0032; H02M 3/33573; H02M 3/01
See application file for complete search history.

(56) References Cited

U.S. PATENT DOCUMENTS

| 7,944,716 B2 | 5/2011 | Halberstadt |
| 10,396,671 B2 | 8/2019 | Beltran et al. |
| 2014/0112027 A1* | 4/2014 | Tseng ................ H02M 3/33546 363/21.13 |
| 2015/0109830 A1* | 4/2015 | Xu .................... H02M 3/33569 363/21.03 |
| 2019/0267906 A1 | 8/2019 | Zhang |
| 2020/0007032 A1 | 1/2020 | Elferich et al. |
| 2020/0287472 A1 | 9/2020 | Ye et al. |

FOREIGN PATENT DOCUMENTS

| EP | 2269293 B1 | 4/2013 |
| EP | 3068027 A1 | 9/2016 |
| TW | 201433074 A | 8/2014 |

* cited by examiner

*Primary Examiner* — Adolf D Berhane
*Assistant Examiner* — Afework S Demisse
(74) *Attorney, Agent, or Firm* — Li & Cai Intellectual Property (USA) Office (57) ABSTRACT

An LLC resonant converter is provided, which includes an input power source, a full-bridge switch circuit, a resonant circuit, a transformer, a rectifier circuit, a load, and a control circuit. The control circuit includes a load detection circuit and a valley switching circuit. The load detection circuit detects a load state of the load. The valley switching circuit is configured to, in response to the load state being a light load state: correspondingly generate a first difference voltage; calculate a first switch on-time for a first switch and a fourth switch; generate switching signals that control the first switch and the fourth switch to be turned off, and detect voltage valleys of a second switch and a third switch; and generate the switching signals to control the second switch and the third switch to be turned on according to the calculated first switch on-time.

10 Claims, 11 Drawing Sheets

LLC RESONANT CONVERTER

CROSS-REFERENCE TO RELATED PATENT APPLICATION

This application claims the benefit of priority to Taiwan Patent Application No. 109138052, filed on Nov. 2, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an LLC resonant converter, and more particularly to an LLC resonant converter with a valley switching mechanism under a light load state.

BACKGROUND OF THE DISCLOSURE

In order to achieve a goal of miniaturization of power supplies, the volume of magnetic components can be reduced by increasing an operation frequency. However, hard switching of switches in basic switching power architecture causes switching losses, and as the operation frequency increases, the switching losses inevitably increases, resulting in an increase in volume of heat dissipation components used. In order to address issues caused by the hard switching, and at the same time achieve higher frequency and miniaturization of circuits used in the power supplies, an LLC resonant converter having a circuit architecture with zero voltage switching is widely used.

Switches of the LLC resonant converter can achieve a zero-voltage switching (ZVS). As a load decreases, a gain curve of the LLC resonant converter tends to be flat, so that the operation frequency needs to be increased to maintain an output voltage. However, when the LLC resonant converter operates under a load state that is close to a no-load state, the gain curve is smoother, and even if the operation frequency is increased, the output voltage still cannot meet specification requirements under an influence of parasitic elements.

Therefore, improving a control mechanism to address the issues caused by the LLC resonant converters under light load has become an important topic in the related art.

SUMMARY OF THE DISCLOSURE

In response to the above-referenced technical inadequacies, the present disclosure provides an LLC resonant converter with a valley switching mechanism under a light load state.

In one aspect, the present disclosure provides an LLC resonant converter including an input power source, a full-bridge switch circuit, a resonant circuit, a transformer, a rectifier circuit, a load, and a control circuit. The input power source has an input voltage. The full-bridge switch circuit is coupled to the input power source and has a first switch, a second switch, a third switch, and a fourth switch, which are configured to be switched between on and off in a resonant period according to a plurality of switching signals. The resonant circuit is coupled to the full-bridge switch circuit and includes a resonant inductor, a resonant capacitor, and a magnetizing inductor. The transformer is coupled to the resonant circuit including a primary winding and a secondary winding, and the primary winding is coupled to the resonant circuit. The rectifier circuit is electrically connected to the secondary winding of the transformer and configured to rectify a secondary AC signal output by the secondary winding, and to output an output voltage. The load is coupled to the rectifier circuit and receives the output voltage. The control circuit includes a load detection circuit and a valley switching circuit. The load detection circuit is configured to detect a load state of the load and correspondingly output a load state signal. The valley switching circuit is configured to, in response to the load state being a light load state: compare the output voltage with a first reference voltage to correspondingly generate a first difference voltage; calculate a first switch on-time for the first switch and the fourth switch according to the first difference voltage; generate, in response to on-times of the first switch and the fourth switch exceeding the first switch on-time, the switching signals that control the first switch and the fourth switch to be turned off, and detect voltage valleys of the second switch and the third switch; generate, in response to detecting the voltage valleys, the switching signals to control the second switch and the third switch to be turned on according to the calculated first switch on-time.

In some embodiments, the control circuit further includes a frequency conversion control circuit, and in response to the load state being a heavy load state, the frequency conversion control circuit is configured to: compare the output voltage with a second reference voltage to correspondingly generate a second difference voltage; calculate a control frequency according to the second difference voltage, and correspondingly generate a frequency control signal; and generate the switching signals according to the frequency control signal to control the first switch, the second switch, the third switch, and the fourth switch.

In some embodiments, the load detection circuit is configured to detect the load state by: sampling the output voltage and an output current generated on the load; and calculating an output power ratio between an output power and a maximum power.

In some embodiments, the load detection circuit is configured to determine that the load state is the light load state when the output power ratio is less than 6%, and determine that the load state is the heavy load state when the output power ratio is greater than 8%.

In some embodiments, the valley switching circuit includes a first subtractor, a first compensator, a first pulse width modulation (PWM) module, and a valley detection circuit. The first subtractor is configured to subtract the output voltage from a first reference voltage to correspondingly generate the first difference voltage. The first compensator is configured to calculate the first switch on-time for the first switch and the fourth switch according to the first difference voltage. The first PWM module is configured to, in response to the on-times of the first switch and the fourth switch exceeding the first switch on-time, generate the switching signals that control the first switch and the fourth switch to be turned off. The valley detection circuit is configured to sample the magnetizing inductor to obtain a magnetizing inductance voltage, and detect the voltage valleys of the second switch and the third switch by detecting a voltage valley of the magnetizing inductance voltage. In response to detecting the voltage valley of the magnetizing inductance voltage, the valley detection circuit is configured to control the first PWM module to generate the switching signals to control the second switch and the third switch to be turned on according to the calculated first switch on-time.

In some embodiments, the valley detection circuit is configured to count a number of times that the magnetizing inductance voltage is 0V, and after the number of times that the magnetizing inductance voltage is 0V reaches a predetermined number of times and a predetermined resonant period is elapsed, the valley detection circuit is configured to control the first PWM module to generate the switching signals to control the second switch and the third switch to be turned on according to the calculated first switch on-time.

In some embodiments, the predetermined number of times is at least 3 times.

In some embodiments, the predetermined resonant period is less than the resonant period.

In some embodiments, the predetermined resonant period is ¼ of the resonant period.

In some embodiments, the frequency conversion control circuit includes a second subtractor, a second compensator, and a second PWM module. The second subtractor is configured to compare the output voltage with the second reference voltage to correspondingly generate the second difference voltage. The second compensator is configured to calculate the control frequency according to the second difference voltage, and correspondingly generate the frequency control signal. The second PWM module is configured to generate the switching signals according to the frequency control signal to control the first switch, the second switch, the third switch, and the fourth switch.

Therefore, the LLC resonant converter provided by the present disclosure adjusts the output voltage in a closed-loop control manner by detecting the switching of the voltage valley to improve a voltage regulation rate under the light load state. The switching voltage can be switched at the voltage valley, thereby reducing the switching loss of the switches. Since the closed-loop control manner is utilized, output ripple voltage thereof is smaller than that of a burst mode control.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
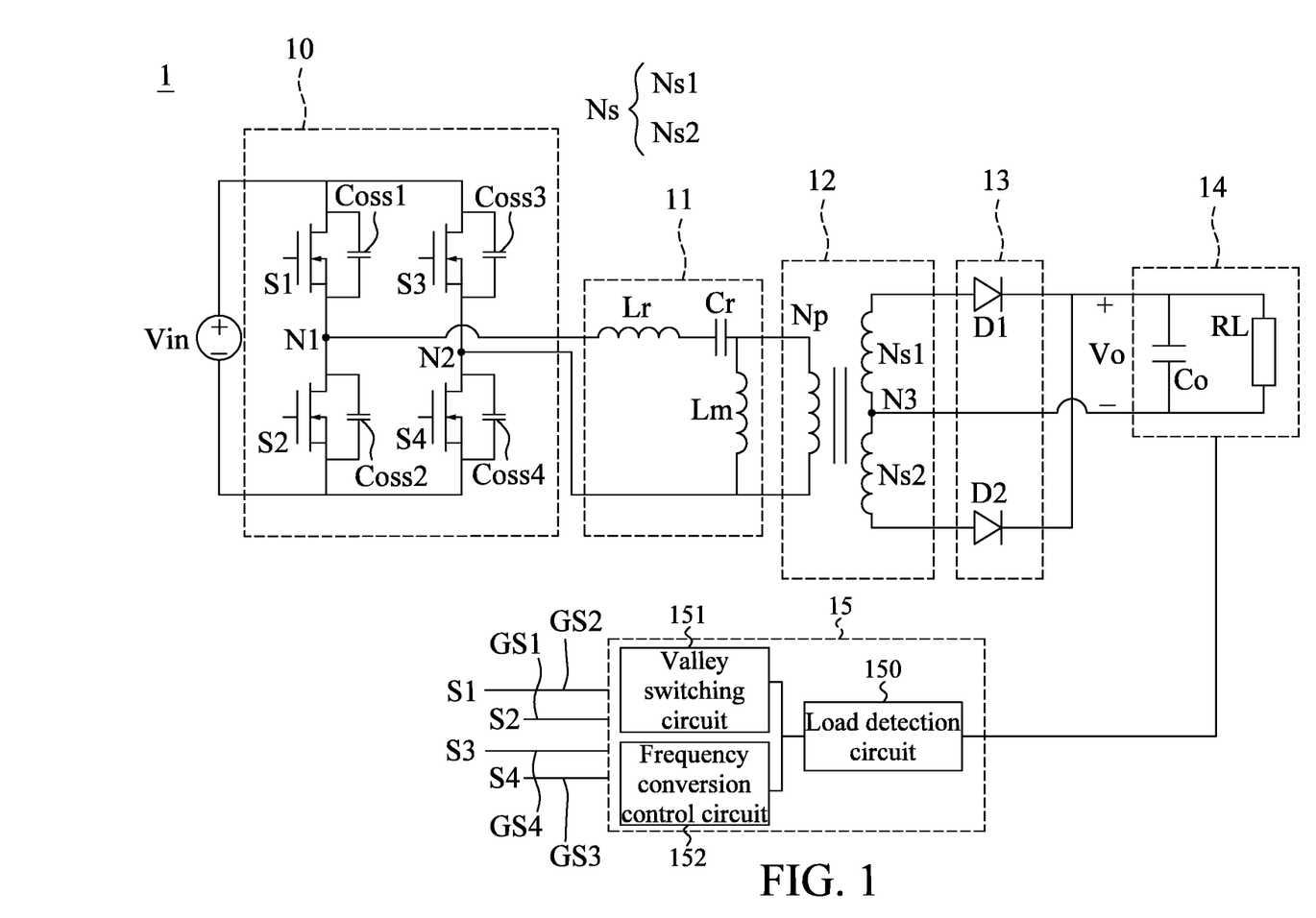
FIG. 1 is a circuit layout of an LLC resonant converter according to an embodiment of the present disclosure.

Referring to FIG. 1, FIG. 1 is a circuit layout of an LLC resonant converter according to an embodiment of the present disclosure. The embodiment of the present disclosure provides an LLC resonant converter 1, which includes an input power source that provides an input voltage Vin, a full-bridge switch circuit 10, a resonant circuit 11, a transformer 12, a rectifier circuit 13, an output load 14, and a control circuit 15.

The full-bridge switch circuit 10 is connected to the input voltage Vin and has a first switch S1, a second switch S2, a third switch S3, and a fourth switch S4. In this architecture, the first switch S1 is connected to a positive input terminal of the input power source, the second switch S2 is connected to a negative input terminal of the input power source, and the first switch S1 and the second switch S2 are connected in series through a first node N1. Similarly, the third switch S3 is connected to the positive input terminal of the input power source, the fourth switch S4 is connected to the negative input terminal of the input power source, and the third switch S3 and the fourth switch S4 are connected in series through a second node N2. In some embodiments, the first switch S1, the second switch S2, the third switch S3, and the fourth switch S4 can be MOSFETs, and have parasitic capacitors Coss1, Coss2, Coss3, and Coss4, respectively. Each of these parasitic capacitors can be an output power capacitor formed by a capacitor between a drain and a source of MOSFET, and a capacitor between a gate and a drain of MOSFET.

Furthermore, an output side of the full-bridge switch circuit 10 is electrically connected to an input side of the resonant circuit 11 for outputting AC signals to the resonant circuit 11. In detail, the first switch S1, the second switch S2, the third switch S3, and the fourth switch S4 are configured to receive a plurality of driving signals GS1, GS2, GS3, and GS4, and are controlled by the driving signals GS1, GS2, GS3, and GS4 to be switched between on and off.

The resonant circuit 11 is coupled to the full-bridge switch circuit 10 and includes a resonant inductor Lr, a resonant capacitor Cr, and a magnetizing inductor Lm. In some embodiments, the resonant inductor Lr and the magnetizing inductor Lm can be formed by a leakage inductor and a magnetizing inductor of the transformer 12, respectively. In other embodiments, the resonant capacitor Cr, the resonant inductor Lr, and the magnetizing inductor Lm can also be electrically connected in different ways to implement an LLC resonant circuit. In this architecture, the resonant capacitor Cr, the resonant inductor Lr, and the magnetizing inductor Lm are connected in series with each other, the magnetizing inductor Lm and a primary winding Np of the transformer 12 are connected in parallel with each other, the resonant capacitor Cr is connected to the first node N1, and the magnetizing inductor Lm and the primary winding Np is connected to the second node N2.

The transformer 12 is coupled to the resonant circuit 11 and includes the primary winding Np and a secondary winding Ns. The primary winding Np is coupled to the resonant circuit 11, and the primary winding Np and the secondary winding Ns have a turns ratio therebetween. As shown in FIG. 1, the transformer 12 can be a transformer with a center tap on a secondary side, and the secondary winding Ns includes a first secondary winding Ns1 and a second secondary winding Ns2. The first secondary winding Ns1 is connected to the second secondary winding Ns2 through a third node N3.

The rectifier circuit 13 is electrically connected to the secondary winding Ns of the transformer 12 for rectifying secondary AC signals output by the secondary winding Ns, and to output an output voltage Vo. In some embodiments, the rectifier circuit 13 is electrically connected to the first secondary winding Ns1 and the second secondary winding Ns2 of the transformer 12, so as to rectify a secondary current output by the first secondary winding Ns1 and the second secondary winding Ns2 that sense signal changes on the primary winding Np to provide the output voltage Vo.

In some embodiments, the rectifier circuit 13 includes a first diode D1 and a second diode D2 connected in parallel. The first diode D1 is connected to the first secondary winding Ns1, the second diode D2 is connected to the second secondary winding Ns2, the first secondary winding Ns1 and the second secondary winding Ns2 are both connected to a positive output terminal, and the third node N3 is connected to a negative output terminal. In this way, electrical signals induced and output by the first secondary winding Ns1 and the second secondary winding Ns2 are rectified by the rectifier circuit 13 to provide a DC output voltage Vo.

The output load 14 is coupled to the rectifier circuit through the positive output terminal and the negative output terminal. The output load 14 can include an output capacitor Co and a load RL. The output capacitor Co can be used to filter the output voltage Vo and provide the same to the load RL.

The control circuit 15 includes a load detection circuit 150, a valley switching circuit 151, and a frequency conversion control circuit 152. The control circuit 15 of the present disclosure is provided in a dual-mode control manner, which is in an LLC frequency conversion mode under a heavy load state, and is switched to a closed-loop valley switching control mode under a light load state to enable the circuit to stabilize the output voltage Vo, which is difficult to accomplish under the light load state. The control circuit 15 can be, for example, a central processing unit, a microcontroller, or a digital signal processor.

Figure 2:
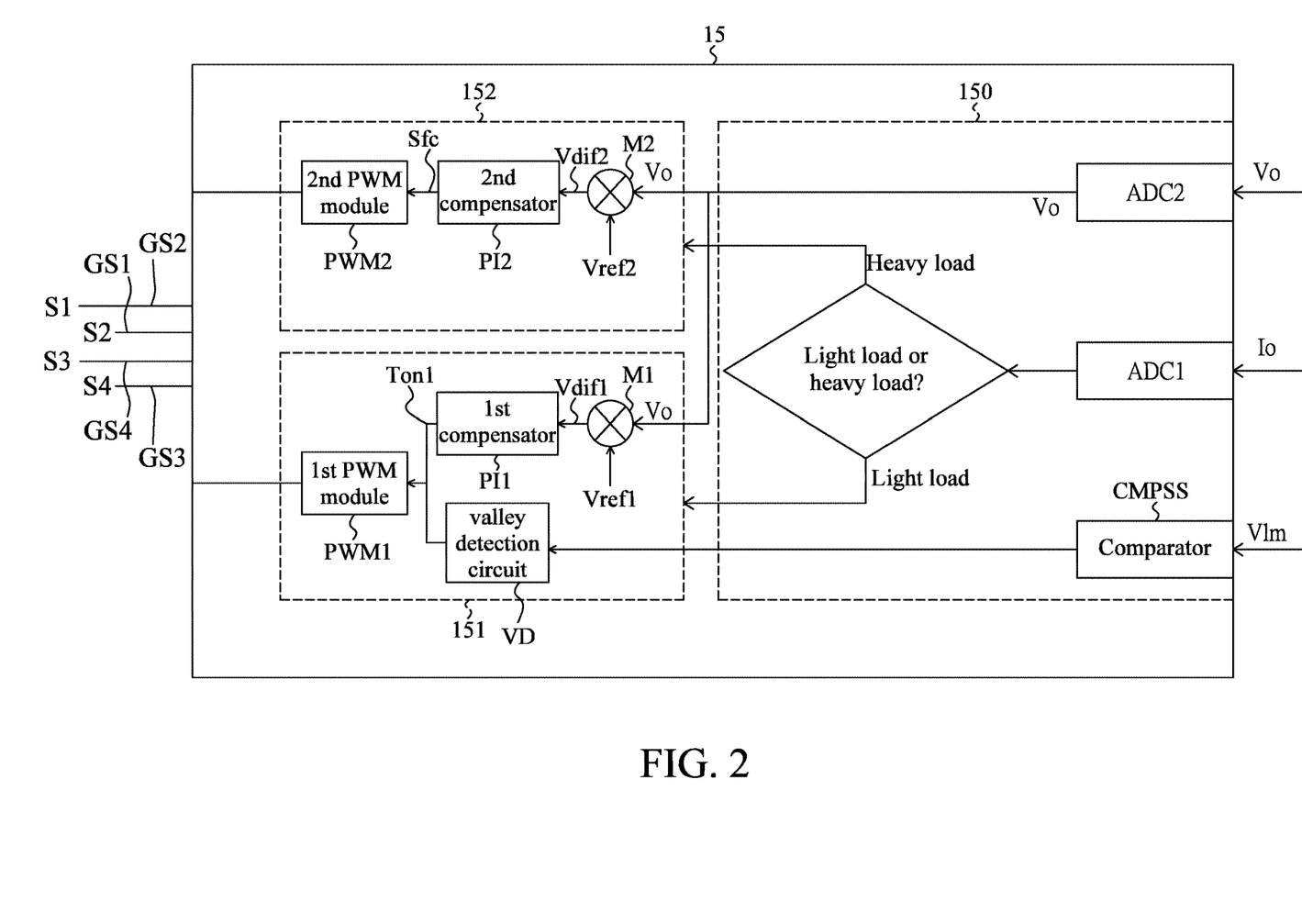
FIG. 2 is a functional block diagram of a control circuit according to an embodiment of the present disclosure.

The load detection circuit 150 is configured to detect a load state of the load RL and correspondingly output a load state signal SL. For example, further reference can be made to FIG. 2, which is a functional block diagram of a control circuit according to an embodiment of the present disclosure. As shown in FIG. 2, the load detection circuit 150 can include a first analog-to-digital converter ADC1, a second analog-to-digital converter ADC2, and a comparator CMPSS, where the first analog-to-digital converter ADC1 and the second analog-to-digital converter ADC2 can respectively sample the output voltage Vo and an output current Io generated on the load RL, while the comparator CMPSS samples a magnetizing inductance voltage Vlm and calculates sampled values to generate a corresponding pulse signal.

The load detection circuit 150 further calculates an output power ratio between an output power and a maximum power to detect the load state. For example, it is determined that the load state is the light load state when the output power ratio is less than 6%, and it is determined that the load state is the heavy load state when the output power ratio is greater than 8%.

In response to the load state being the light load state, the valley switching circuit 151 can compare the output voltage Vo with a first reference voltage Vref1 to correspondingly generate a first difference voltage, and calculate a first switch on-time Ton1 for the first switch S1 and the fourth switch S4 according to the first difference voltage. In response to on-times of the first switch S1 and the fourth switch S4 exceeding the first switch on-time Ton1, the valley switching circuit 151 generates switching signals GS1 and GS4 that control the first switch S1 and the fourth switch S4 to be turned off, and detects voltage valleys of the second switch S2 and the third switch S3. The valley switching circuit 151 further generates, in response to detecting the voltage valleys, switching signals GS2 and GS3 to control the second switch S2 and the third switch S3 to be turned on according to the calculated first switch on-time Ton1.

For example, further referring to FIG. 2, the valley switching circuit 151 includes a first subtractor M1, a first compensator PI1, a first pulse width modulation module PWM1, and a valley detection circuit VD.

The first subtractor M1 subtracts the output voltage Vo and the first reference voltage Vref1 to correspondingly generate a first difference voltage Vdif1. The first compensator PI1 calculates the first switch on-time Ton1 for the first switch S1 and the fourth switch S4 according to the first difference voltage Vdif1. The first compensator PI1 can be a proportional integral controller, for example.

The first pulse width modulation module PWM1 is configured to, in response to the on-times Ton of the first switch S1 and the fourth switch S4 exceeding the first switch on-time Ton1, generate switching signals GS1 and GS4 that respectively control the first switch S1 and the fourth switch S4 to be turned off.

The valley detection circuit VD can sample the magnetizing inductor Lm through the comparator CMPSS to obtain the magnetizing inductance voltage Vlm, and detect voltage valleys of the second switch S2 and the third switch S3 by detecting the voltage valley of the magnetizing inductance voltage Vlm. In detail, the valley detection circuit VD mainly adopts a valley switching mechanism in a decoupling phase of the transformer 12. In this phase, the resonance inductor Lr, the magnetizing inductor Lm, the resonant capacitor Cr, and the parasitic capacitors of the switch (for example, the parasitic capacitors Coss1 to Coss4) are resonant.

In addition, in this phase, the magnetizing inductor Lm is in parallel with the parasitic capacitors of the switches (for example, parasitic capacitances Coss1 to Coss4), therefore, the magnetizing inductance voltage Vlm is in phase with the switching voltages (for example, voltages across the first switch S1 and the fourth switch S4), and valley points of the switching voltages at this time are also the valley point of the magnetizing inductance voltage Vlm. Therefore, in the present disclosure, the magnetizing inductance voltage Vlm is sampled to detect the valley points of the switching voltages.

In more detail, the valley detection circuit VD is configured to count the number of times that the magnetizing inductance voltage Vlm is 0V, and after the number of times that the magnetizing inductance voltage Vlm is 0V reaches a predetermined number of times and a predetermined resonant period elapses, it is determined that the valley point is detected.

In some embodiments, during the decoupling phase, the magnetizing inductance voltage Vlm will resonate with 0 V as a reference. Therefore, an interval between the magnetizing inductance voltage Vlm being 0 is about half of the resonant period. The valley detection circuit VD starts to count the number of times the magnetizing inductance voltage is 0V when the first switch S1 and the fourth switch S4 are turned on. After detecting that the magnetizing inductance voltage is 0V for the third time, and another quarter of the resonant period is elapsed, the first switch S1 and the fourth switch S4 are turned on. At this time, the switch voltages are just at the valley point.

Therefore, in a preferred embodiment of the present disclosure, the predetermined number of times is at least 3 times, and the predetermined resonant period can be smaller than the resonant period, and preferably is ¼ of the resonant period.

On the other hand, in response to detecting the voltage valley, the valley detection circuit is configured to control the first pulse width modulation module PWM1 to generate switching signals GS2 and GS3 to control the second switch S2 and the third switch S3 to be turned on according to the calculated first switch on-time Ton1, such that the output voltage Vo is stabilized.

The above-mentioned control of the first switch S1 to the fourth switch S4 is performed in a positive half cycle, while in a negative half cycle, a dual operation is performed and corresponding switching signals GS1 to GS4 are generated. Since the operation principle is the same, repeated descriptions will be omitted hereinafter.

Reference is made back to FIG. 1, in response to the load state being the heavy load state and entering the frequency conversion mode, the frequency conversion control circuit 152 can compare the output voltage Vo with a second reference voltage Vref2 to correspondingly generate a second difference voltage Vdif2, calculate the control frequency accordingly, and correspondingly generate a frequency control signal Sfc. The frequency conversion control circuit 152 further generates switching signals GS1 to GS4 according to the frequency control signal Sfc to control the first switch S1 to the fourth switch S4.

Referring to FIG. 2, the frequency conversion control circuit 152 includes a second subtractor M2, a second compensator PI2, and a second pulse width modulation module PWM2. The second subtractor M1 is configured to compare the output voltage Vo with the second reference voltage Vref2 to generate the second difference voltage Vdif2 correspondingly. The second compensator PI2 calculates a control frequency according to the second difference voltage Vdif2, and correspondingly generates the frequency control signal Sfc. Similarly, the second compensator PI2 can be a proportional integral controller, for example. The second pulse width modulation module PWM2 generates switching signals GS1 to GS4 according to the frequency control signal Sfc to control the first switch S1 to the fourth switch S4.

Figure 3:
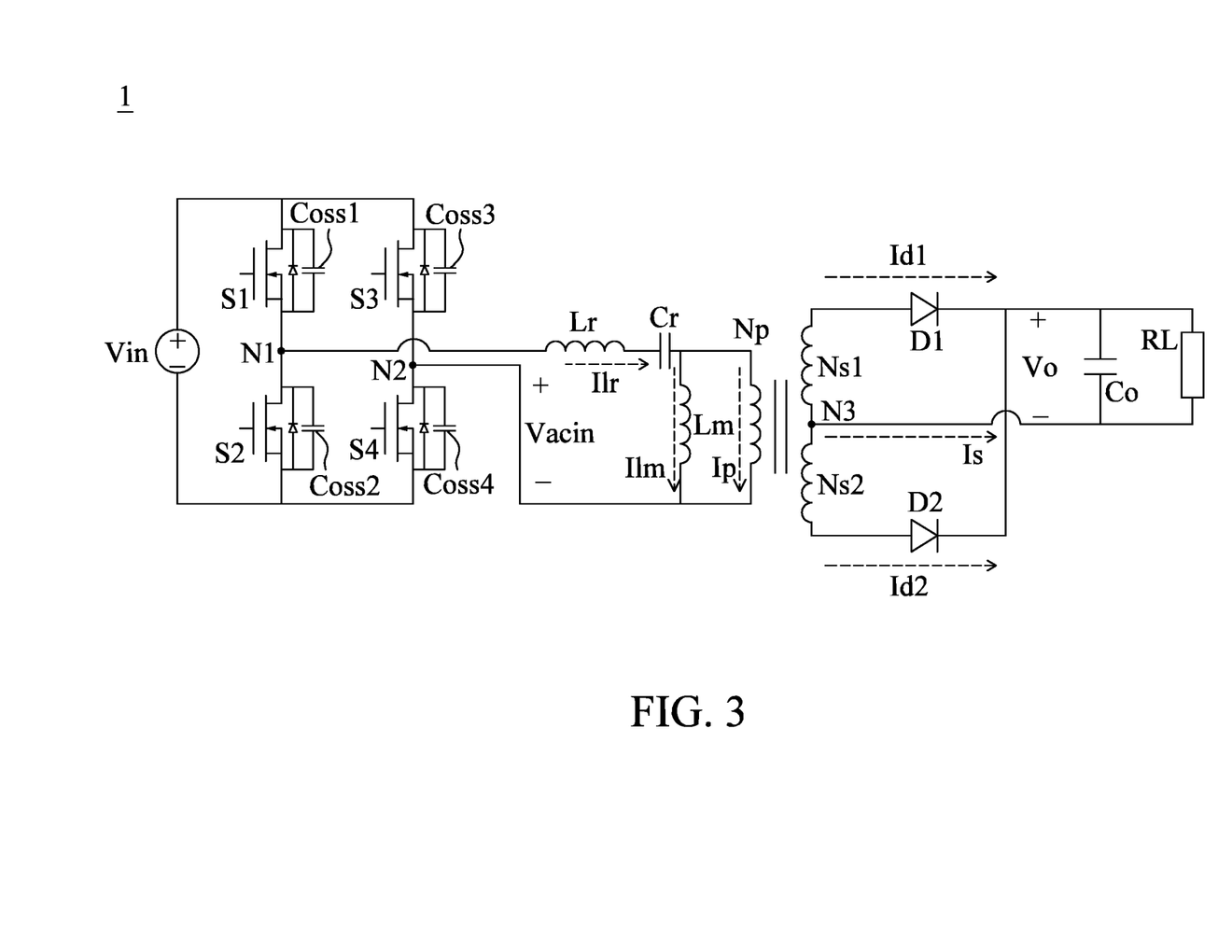
FIG. 3 shows a circuit architecture of a full-bridge LLC resonant converter according to an embodiment of the present disclosure.

Circuit actions and principles of an LLC closed-loop valley switching control strategy operated in the light load state provided by the present disclosure will be illustrated in detail hereinafter. Reference is further made to FIG. 3, which shows a circuit architecture of a full-bridge LLC resonant converter according to an embodiment of the present disclosure. Vin is the input voltage, Vacin is an input voltage of the resonant circuit 11, Vcr is a voltage of the resonant capacitor Cr, Vlm is the magnetizing inductance voltage, Ilr is the resonant current, Ilm is the magnetizing current, Ip is the primary side current of the transformer 12, Is is the secondary side current of the transformer 12, Vo is the output voltage, Id1 and Id2 are each currents passing through the first diode D1 and the second diode D2.

In order to simplify the analysis of action phases, the following assumptions are first proposed: (1) only a parasitic capacitor COSS and a body diode are considered for a power switch; (2) the output capacitance is extremely large, and the output voltage can be regarded as a voltage source; and (3) components of the circuit are all ideal and does not produce any loss.

Figure 4:
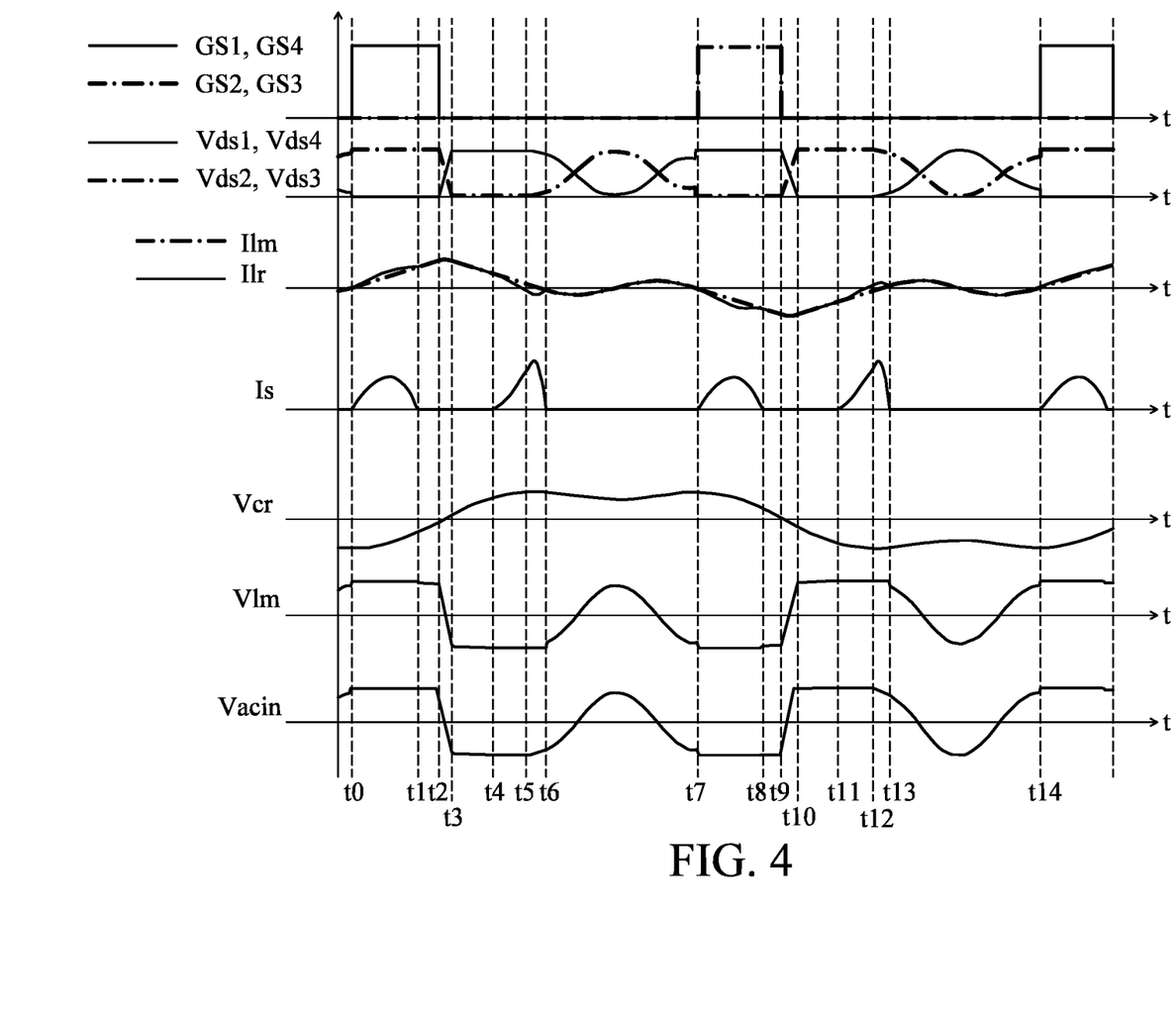
FIG. 4 is a timing diagram showing actions of the full-bridge LLC resonant converter operating under a light-load closed-loop valley switching control according to an embodiment of the present disclosure.

FIG. 4 is a timing diagram showing actions of the full-bridge LLC resonant converter according to an embodiment of the present disclosure when operating under light-load closed-loop valley switching control. In FIG. 4, Vds1, Vds2, Vds3, and Vds4 are voltages across the first switch S1 to the fourth switch S4, respectively. One cycle can be divided into 14 stages, in which time t0 to time t7 on time axis t are in a paired state with time t7 to time t14, so the following will describe phases from time t0 to time t7. Reference is made to FIGS. 5 to 11, which are circuit diagrams of the LLC resonant converter in phase 1 to phase 7 of FIG. 4, respectively, according to an embodiment of the present disclosure.

Figure 5:
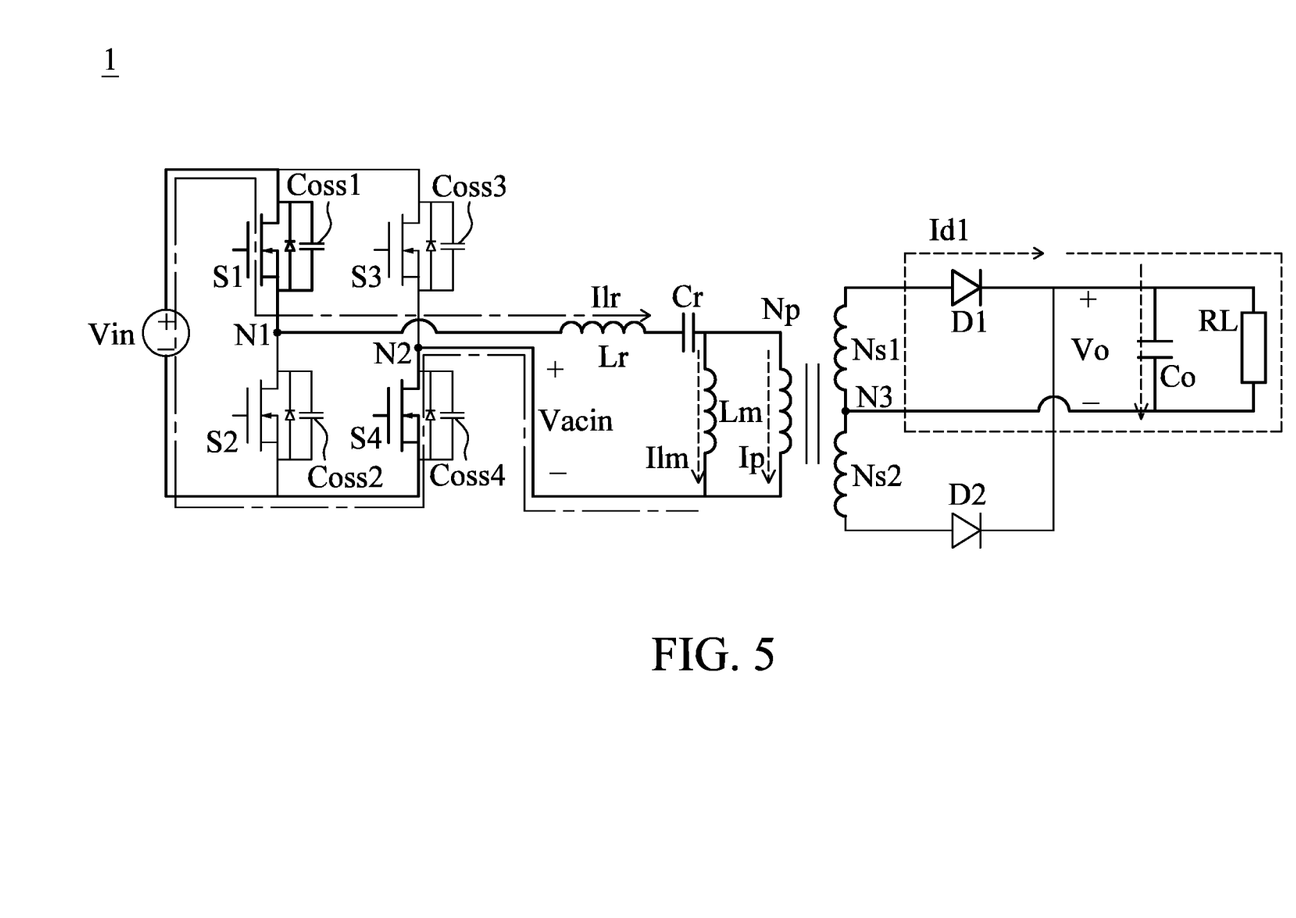
FIGS. 5 to 11 are circuit diagrams of the LLC resonant converter in phase 1 to phase 7 of FIG. 4, respectively, according to an embodiment of the present disclosure.

Phase 1 (t0-t1):

At time t0, the first switch S1 and the fourth switch S4 are turned on at a low voltage, and the second switch Q2 and the third switch Q3 are maintained in an off state. The resonant inductor Lr resonates with the resonant capacitor Cr, and the transformer 12 transfers energy to the secondary side. At this time, the output voltage Vo is mapped to the primary side of the transformer 12, such that the magnetizing inductance voltage Vlm is nVo, and the magnetizing current Ilm rises linearly. When the resonant current Ir is equal to the magnetizing current Ilm, the next phase is entered.

Figure 6:
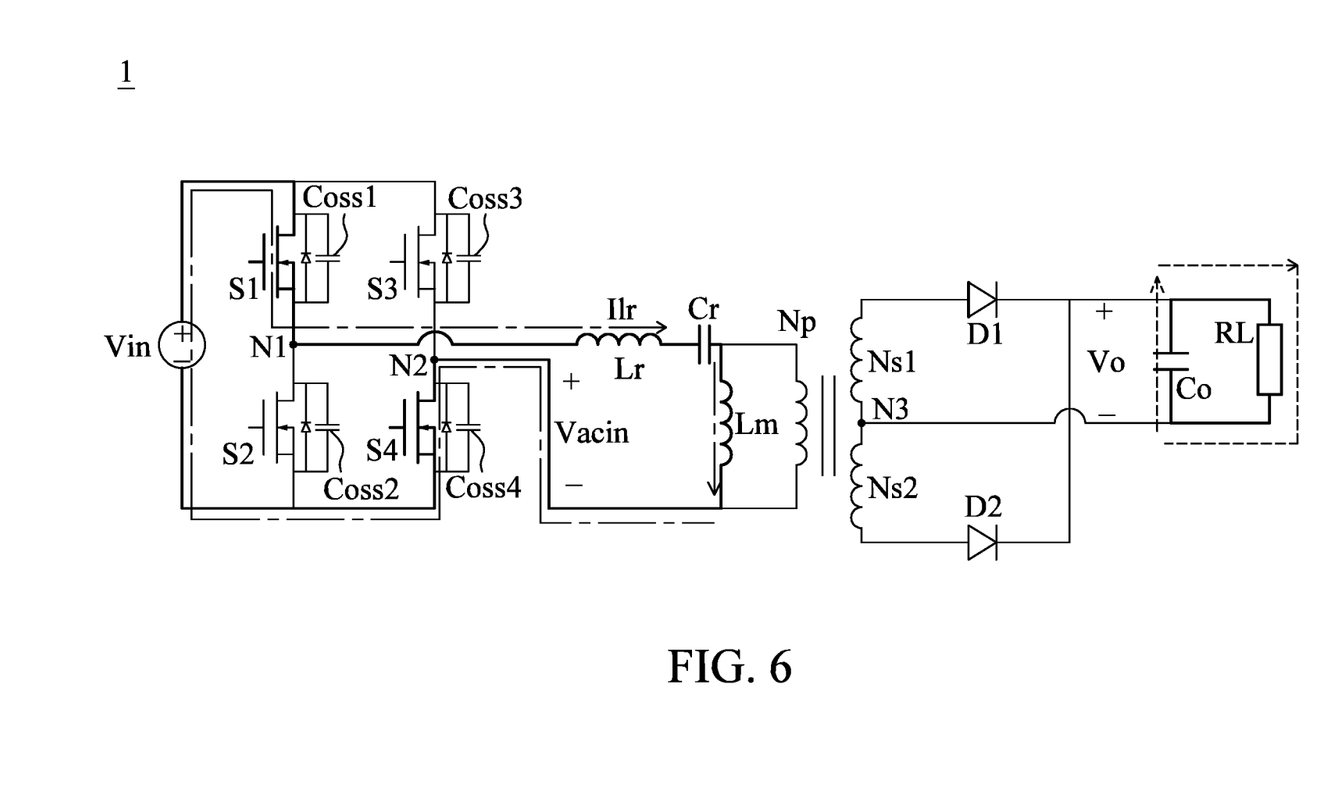

Phase 2 (t1-t2):

Since the resonant current is less than the magnetizing current at this phase, the transformer is in a decoupled state and no longer transmits energy to the secondary side. The resonant inductor Lr, the resonant capacitor Cr, and the magnetizing inductor Lm resonate, and energy of the output load is provided individually by the output capacitor Co. When the first switch Q1 and the fourth switch Q4 are turned off, phase 3 is entered.

Figure 7:
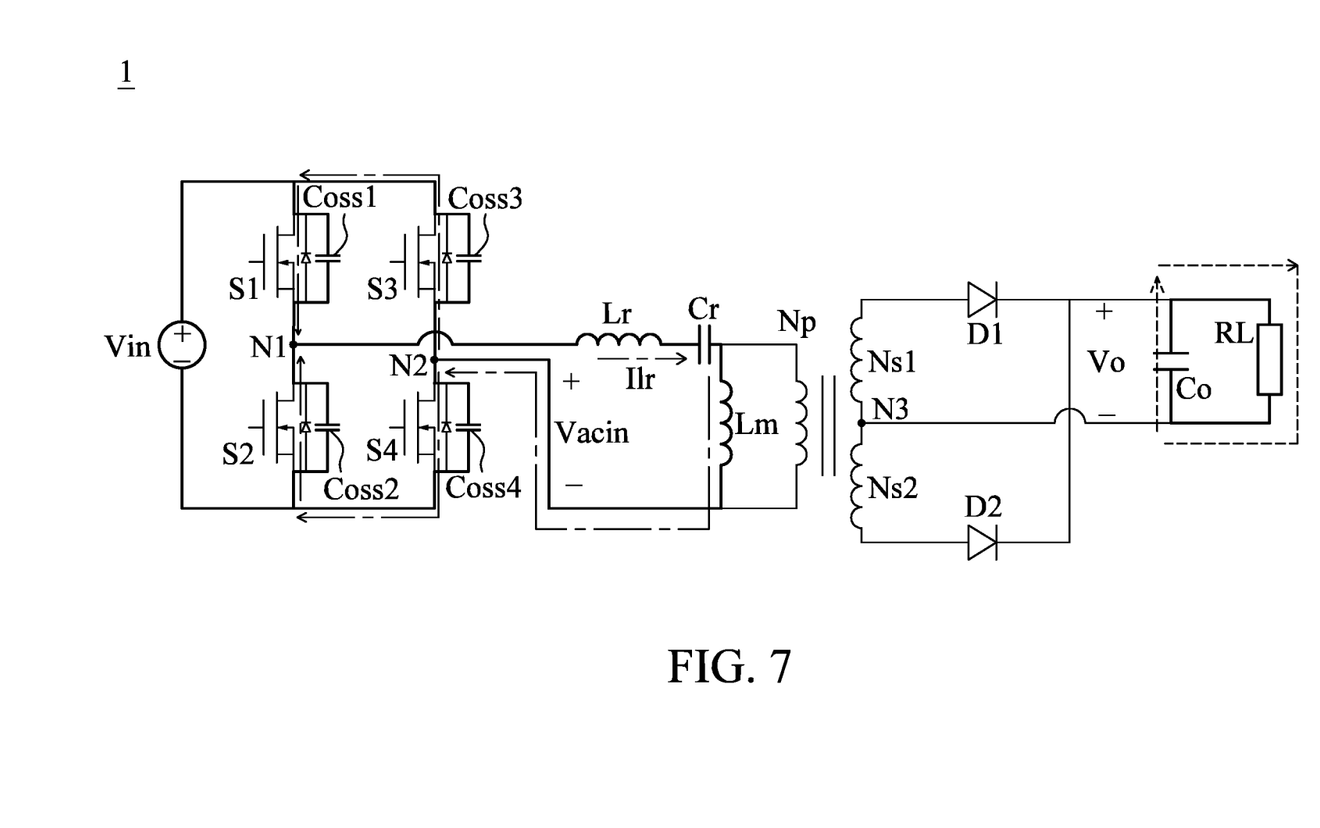

Phase 3 (t2-t3):

After the first switch Q1 and the fourth switch Q4 are turned off, the parasitic capacitances Coss1 to Coss4 participate in resonance, and the transformer 12 is still in the decoupling state. At this time, the resonant current Ilr freewheels to charge the parasitic capacitors Coss1 and Coss4, and after the parasitic capacitors Coss2 and Coss3 are discharged to zero, the body diode conducts and enters the next phase.

Figure 8:
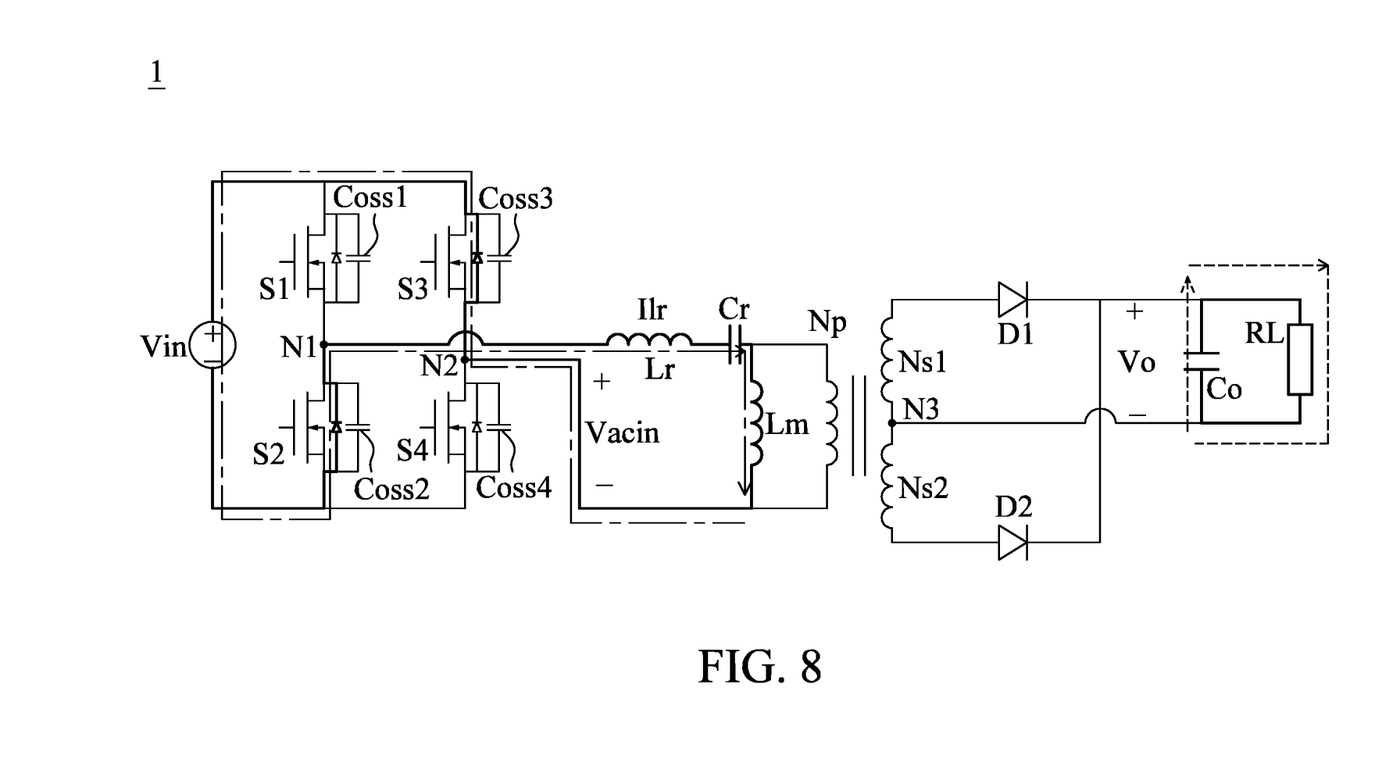

Phase 4 (t3-t4):

The body diodes of the second switch Q2 and the third switch Q3 conducts, the resonant inductor Lr, the resonant capacitor Cr, and the magnetizing inductor Lm resonate, and the transformer 12 is still in the decoupling state. The input voltage Vacin of the resonant circuit 11 is −Vin. At this time, the voltage across the magnetizing inductor Lm can be obtained by dividing the resonant capacitor voltage Vcr and the input voltage Vin, and the energy of the output load RL is still provided by the output capacitor Co. When an absolute value of the magnetizing inductance voltage Vlm is equal to nVo, the next phase is entered.

Figure 9:
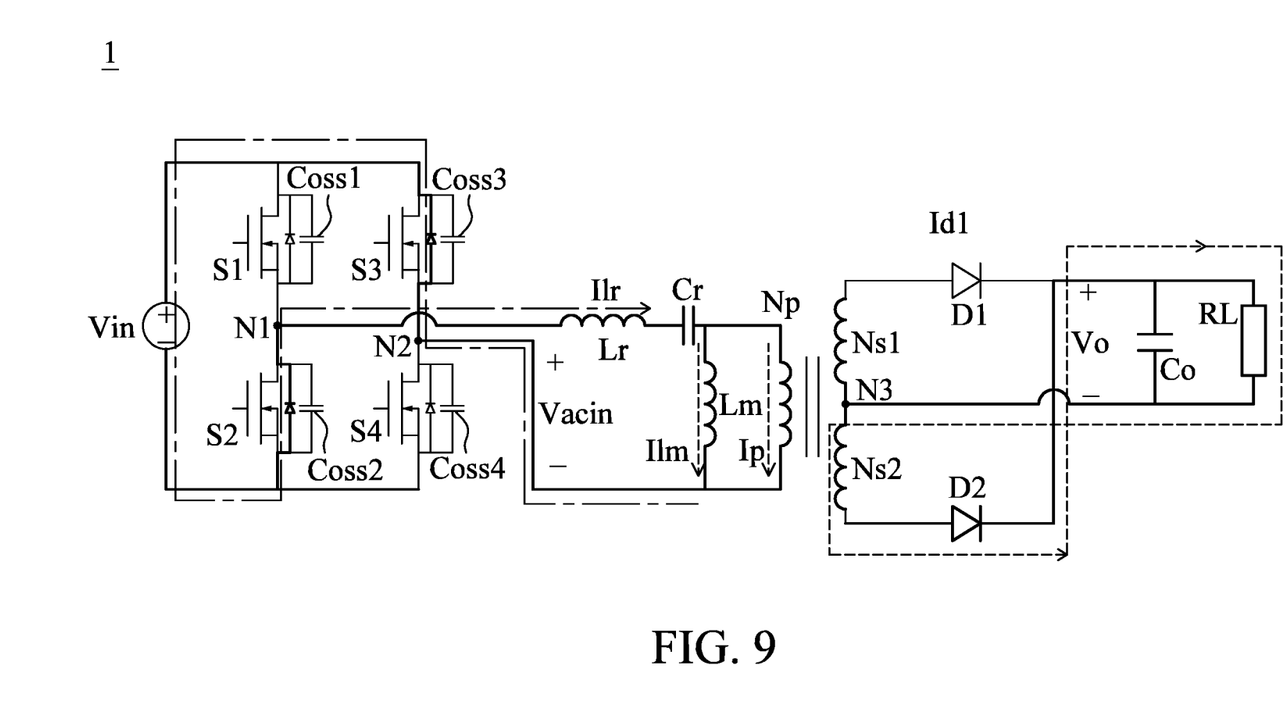

Phase 5 (t4-t5):

The body diodes of the second switch Q2 and the third switch Q3 continue to conduct, the resonant inductor Lr resonates with the resonant capacitor Cr, the transformer 12 starts to transfer energy to the secondary side, and the magnetizing inductor Lm is clamped by a voltage −nVo mapped back by the output, and the magnetizing current ILm decreases linearly. When the resonant current Ilr commutes, the next phase is entered.

Figure 10:
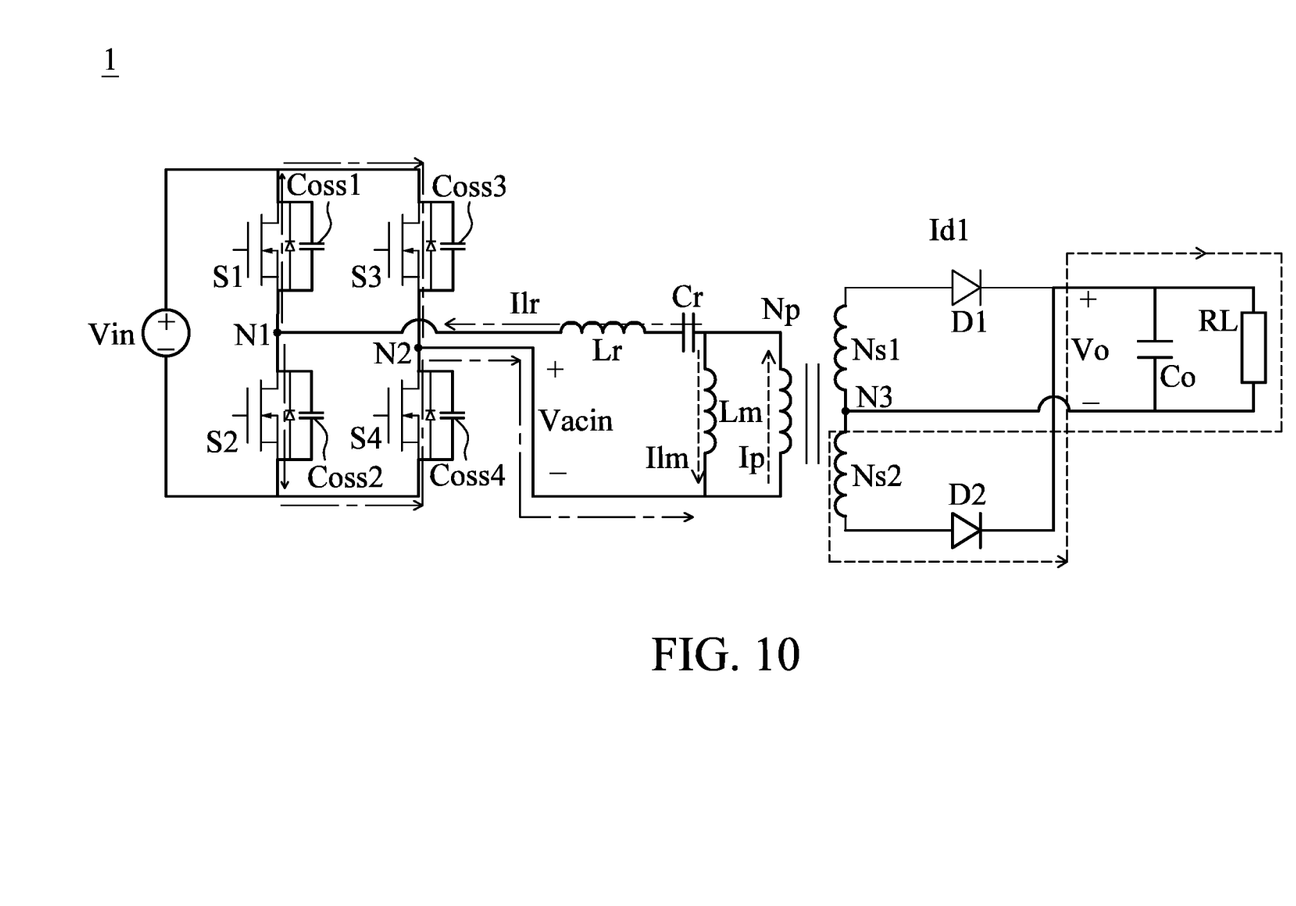

Phase 6 (t5-t6):

When the resonant current Ilr commutes, the body diodes of the second switch Q2 and the third switch Q3 are cut-off. In addition to the resonant inductor Lr resonating with the resonant capacitor Cr in the previous phase, the parasitic capacitors Coss1 to Coss4 of the switches also participate in the resonance. The resonant current ILr charges the second switch Q2 and the third switch Q3, the first switch Q1 and the fourth switch Q4 are discharged, the transformer 12 continues to transfer energy to the secondary side, the magnetizing inductance voltage Vlm is clamped by −nVo mapped to the primary side, and the magnetizing current Ilm decreases linearly. When the transformer 12 is decoupled, the next phase is entered.

Figure 11:
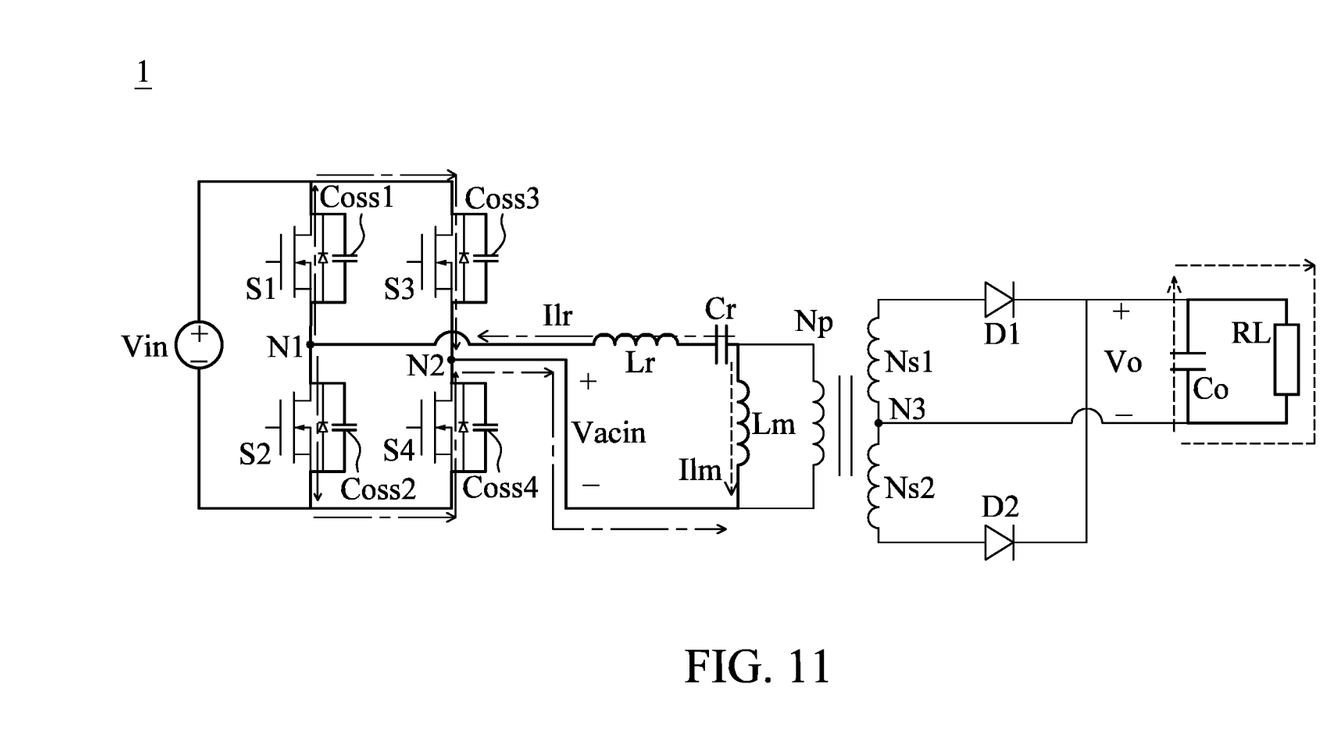

Phase 7 (t6-t7):

Due to the decoupling of the transformer 12 in this phase, the magnetizing inductor Lm will participate in resonance as shown in FIG. 11. Components participating in the resonance include the parasitic capacitors Coss1 to Coss4, the resonant inductor Lr, the resonant capacitor Cr, and the magnetizing inductor Lm. When this control method detects the valley points of the voltages across the second switch Q2 and the third switch Q3, the second switch Q2 and the third switch Q3 are turned on to enter phases from time t7 to time t14.

In FIG. 4, the phase from time t6 to time t7 is the decoupling interval of the transformer 12, in which the resonant inductor Lr, the magnetizing inductor Lm, the resonant capacitor Cr, and the parasitic capacitors Coss1 to Coss4 resonate. In this phase, since the magnetizing inductor Lm is connected in parallel with the parasitic capacitors Coss1 to Coss4, the magnetizing inductance voltage Vlm and the switching voltages are in the same phase. At this time, the valley points of the switching voltages are also a valley point of the magnetizing inductance voltage Vlm.

In the decoupling phase, the magnetizing inductance voltage Vlm resonates with 0 V as the reference. Therefore, an interval between the magnetizing inductance voltage being 0 is about half of the resonant period. The valley detection circuit VD starts to count the number of times that the magnetizing inductance voltage is 0 V when upper and lower bridge switches are turned on. After the magnetizing inductance voltage is detected to be 0 V for the third time and a quarter of the resonant period is elapsed, the switch is turned on at time t7, and the voltages across the switches are exactly at the valley points.

In conclusion, the LLC resonant converter provided by the present disclosure adjusts the output voltage in a closed-loop control manner by detecting the switching of the voltage valley to improve a voltage regulation rate under the light load state. The switching voltage can be switched at the voltage valley, thereby reducing the switching loss of the switches. Since the closed-loop control manner is utilized, output ripple voltage thereof is smaller than that of a burst mode control.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An LLC resonant converter, comprising:
    an input power source with an input voltage;
    a full-bridge switch circuit coupled to the input power source and having a first switch, a second switch, a third switch, and a fourth switch, wherein the first switch, the second switch, the third switch, and the fourth switch are configured to be switched between on and off in a resonant period according to a plurality of switching signals;
    a resonant circuit coupled to the full-bridge switch circuit and including a resonant inductor, a resonant capacitor, and a magnetizing inductor;
    a transformer coupled to the resonant circuit, including a primary winding and a secondary winding, wherein the primary winding is coupled to the resonant circuit;
    a rectifier circuit electrically connected to the secondary winding of the transformer, and configured to rectify a secondary AC signal output by the secondary winding and output an output voltage;
    a load coupled to the rectifier circuit and receiving the output voltage; and
    a control circuit, including:
        a load detection circuit configured to detect a load state of the load and correspondingly output a load state signal; and
        a valley switching circuit configured to, in response to the load state being a light load state:
            compare the output voltage with a first reference voltage to correspondingly generate a first difference voltage;

calculate a first switch on-time of the first switch and the fourth switch according to the first difference voltage;

generate, in response to on-times of the first switch and the fourth switch exceeding the first switch on-time, the switching signals that control the first switch and the fourth switch to be turned off, and detect voltage valleys of the second switch and the third switch; and generate, in response to detecting the voltage valleys, the switching signals to control the second switch and the third switch to be turned on according to the calculated first switch on-time.

2. The LLC resonant converter according to claim 1, wherein the control circuit further includes a frequency conversion control circuit, and in response to the load state being a heavy load state, the frequency conversion control circuit is configured to:

compare the output voltage with a second reference voltage to correspondingly generate a second difference voltage;

calculate a control frequency according to the second difference voltage, and correspondingly generate a frequency control signal; and generate the switching signals according to the frequency control signal to control the first switch, the second switch, the third switch, and the fourth switch.

3. The LLC resonant converter according to claim 2, wherein the load detection circuit is configured to detect the load state by: sampling the output voltage and an output current generated on the load; and calculating an output power ratio between an output power and a maximum power.

4. The LLC resonant converter according to claim 3, wherein the load detection circuit is configured to determine that the load state is the light load state when the output power ratio is less than 6%, and determine that the load state is the heavy load state when the output power ratio is greater than 8%.

5. The LLC resonant converter according to claim 2, wherein the frequency conversion control circuit includes:

a second subtractor configured to compare the output voltage with a second reference voltage to correspondingly generate a second difference voltage;

a second compensator configured to calculate a control frequency according to the second difference voltage, and correspondingly generate a frequency control signal; and a second pulse width modulation (PWM) module is configured to generate the switching signals according to the frequency control signal to control the first switch, the second switch, the third switch, and the fourth switch.

6. The LLC resonant converter according to claim 1, wherein the valley switching circuit includes:

a first subtractor configured to subtract the output voltage from the first reference voltage to correspondingly generate the first difference voltage;

a first compensator configured to calculate the first switch on-time of the first switch and the fourth switch according to the first difference voltage;

a first pulse width modulation (PWM) module configured to, in response to the on-times of the first switch and the fourth switch exceeding the first switch on-time, generate the switching signals that control the first switch and the fourth switch to be turned off; and a valley detection circuit configured to sample the magnetizing inductor to obtain a magnetizing inductance voltage, and detect the voltage valleys of the second switch and the third switch by detecting a voltage valley of the magnetizing inductance voltage, wherein in response to detecting the voltage valley of the magnetizing inductance voltage, the valley detection circuit is configured to control the first PWM module to generate the switching signals to control the second switch and the third switch to be turned on according to the calculated first switch on-time.

7. The LLC resonant converter according to claim 6, wherein the valley detection circuit is configured to count a number of times that the magnetizing inductance voltage is 0V, and after the number of times that the magnetizing inductance voltage is 0V reaches a predetermined number of times and a predetermined resonant period is elapsed, the valley detection circuit is configured to control the first PWM module to generate the switching signals to control the second switch and the third switch to be turned on according to the calculated first switch on-time.

8. The LLC resonant converter according to claim 7, wherein the predetermined number of times is at least 3 times.

9. The LLC resonant converter according to claim 7, wherein the predetermined resonant period is less than the resonant period.

10. The LLC resonant converter according to claim 9, wherein the predetermined resonant period is ¼ of the resonant period.

* * * * *